United States Patent Office 3,456,709
Patented July 22, 1969

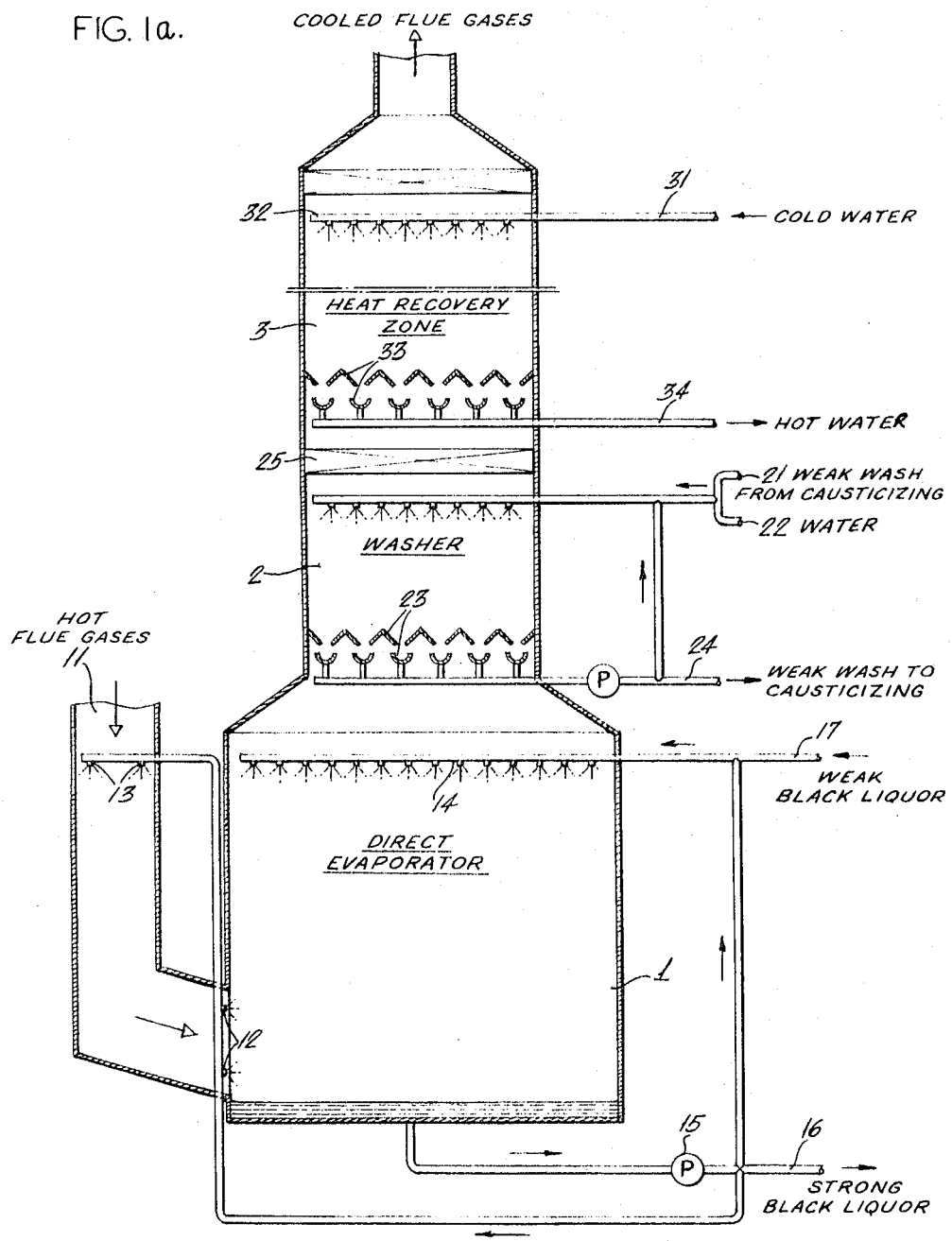

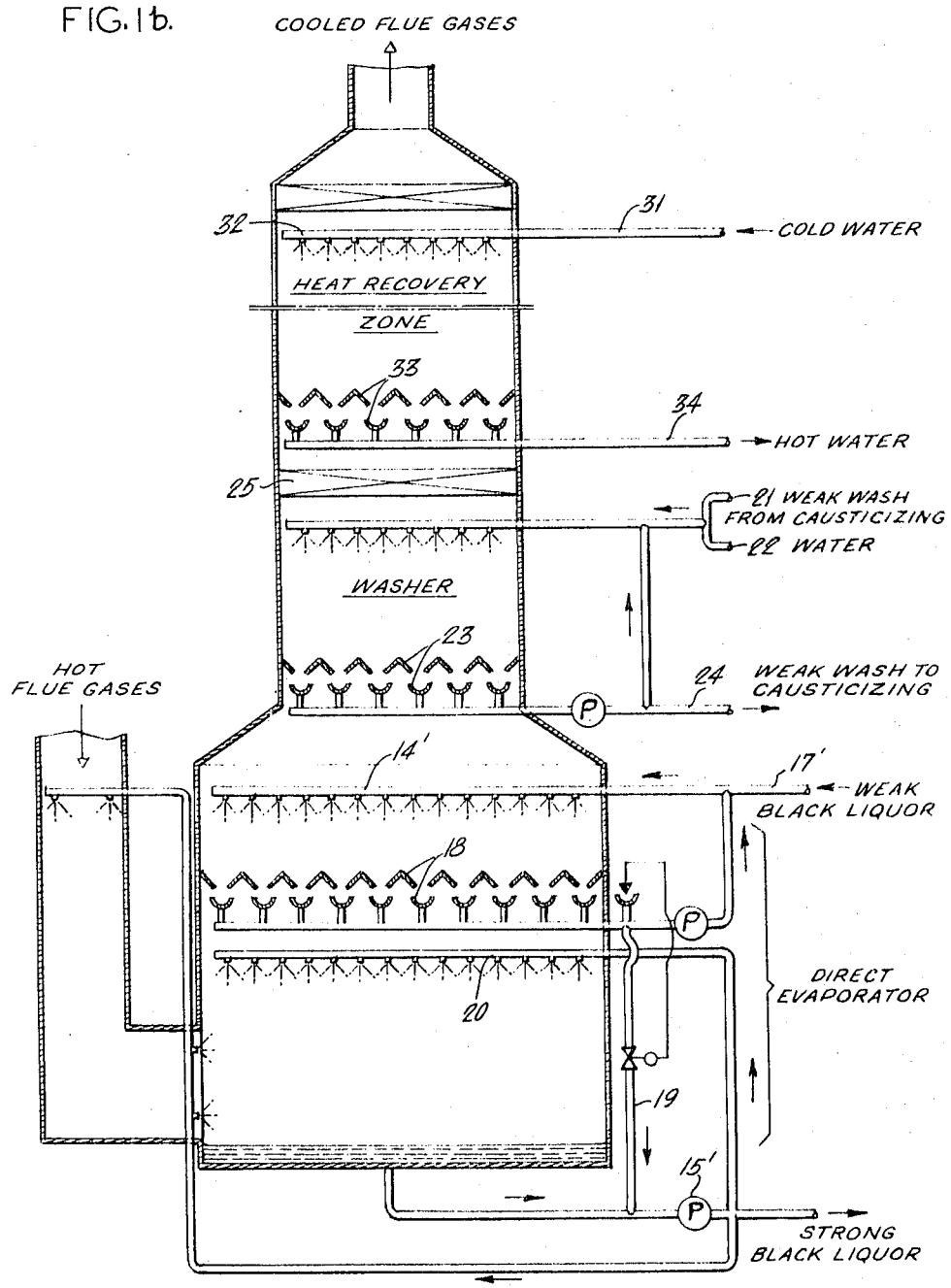

3,456,709
SPRAY CONCENTRATING WEAK BLACK LIQUOR BY CONTACT WITH HOT FLUE GASES
Anders Vegeby, Bandhagen, Sweden, assignor to Aktiebolaget Svenska Flaktfabriken, Stockholm, Sweden
Filed July 17, 1967, Ser. No. 653,948
Claims priority, application Sweden, July 29, 1966, 10,313/66
Int. Cl. B01d 1/16
U.S. Cl. 159—4                                3 Claims

ABSTRACT OF THE DISCLOSURE

To recover chemicals and heat from the waste liquors in cellulose manufacturing, the flue gas from the smelting furnace is passed upwardly through a direct contact spray evaporator, a washer, and a heat recovery zone in sequence. In the direct evaporator, black liquor is at least partially recirculated preferably in two circulating systems. Fresh dilute liquor is added to the upper system to mix with the recirculating liquor, and a portion of the liquor from the upper system is withdrawn and mixed with the liquor which is recirculating in the lower system. Concentrated liquor is withdrawn from the bottom of the evaporator. In the washer, an alkaline liquid is recirculated with fresh liquid being added and a portion being withdrawn as required. In the heat recovery zone cold water is sprayed through the flue gas so as to be heated, and the heated water therefrom is collected and used elsewhere.

---

Figure 2:
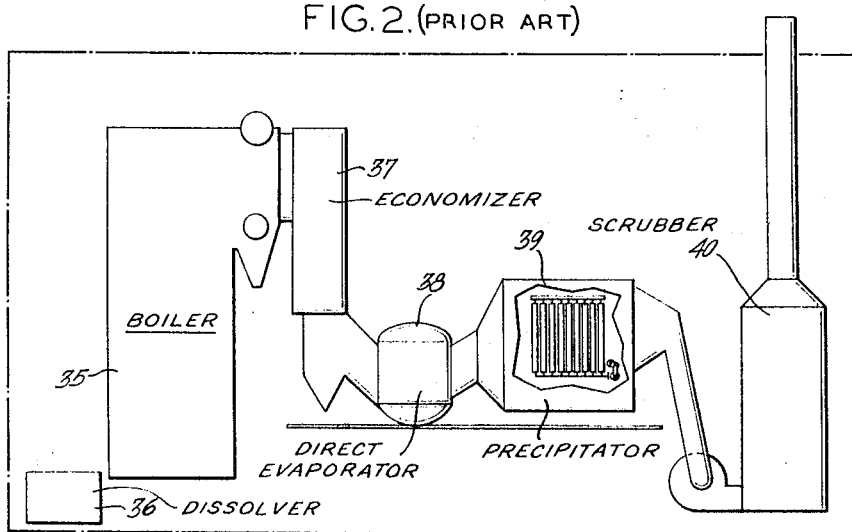

For the recovery of chemicals and heat from the waste liquors in the cellulose manufacturing mostly an injection unit is used, which comprises a smelting surface in combination with a boiler. Subsequent to its evaporation to an appropriate concentration the liquor is injected into the smelting furnace, whereby it is finally evaporated to full dry content upon the contact with the hot flue gases, ignited and combusted. The chemicals usually are recovered as a melt, which is drawn off at the bottom of the unit, and the heat is absorbed from the flue gases by the water-cooled walls of the furnace as well as by the tube set and the super-heater of the boiler. When leaving the boiler, the flue gases usually have a temperature of 400° C. For recovering a greater amount of heat from the flue gases two different systems have been developed, one Scandinavian system and one U.S. system.

The Scandinavian system comprises an economizer for cooling the flue gases from the after-boiler temperature of 400° C. to the after-economizer temperature of 125–150° C. Hereby the heat in the flue gases is transferred to the feed water and combustion air. The flue gases thereafter are passed through a precipitator, where the dust is separated from the flue gases and returned to the process. Additional heat from the flue gases can thereafter be recovered in the form of hot water by a so-called scrubber, of which various constructions are in operation. In one embodiment of the Scandinavian system the precipitator is arranged directly after the boiler, a so-called hot electrostatic filter, and the flue gases thereafter are directed through the economizer. Owing to the fact that the dust in the flue gases is removed before the gases are entering the economizer, it is easier to maintain the economizer clean, and it is therefore possible to utilize smaller heat surfaces in this embodiment than in the older system, where the precipitator is arranged after the economizer. This new embodiment of the Scandinavian system has a very high efficiency degree with respect to heat recovery, and the arrangement can be given a relatively compact design. The installation costs, however, are considerably higher than for the U.S. system.

In the U.S. system of flue gases from the boiler first are cooled in a steel-tube economizer to 250–300° C. and thereafter introduced into a black liquor evaporator of the direct type, where the gases further are cooled to about 125° C. and where the black liquor is evaporated from about 55% to 68% concentration. The evaporation of the black liquor in the direct evaporator is carried out in only one effect and is considerably less economic than in the multiple-effect evaporation according to the Scandinavian system. After the direct evaporation the flue gases are directed through a precipitator, after which a scrubber can be arranged for the recovery of additional heat in the form of hot water. In an arrangement according to the U.S. system the installation part where heat is recovered from the flue gases, comprises a great number of units, which require a great installation volume and large flue gas ducts for transporting the flue gases between the different units.

The present invention has as its object to combine the advantages of the Scandinavian system, i.e., high efficiency degree and compact construction, with the advantage of the U.S. system, viz., low installation costs. According to the invention this object is achieved by a new type of direct evaporator, wherein the flue gases are treated according to a process characterized by the features defined in claim 1. In a suitable embodiment of an installation the direct evaporator can be assembled with a flue gas scrubber, which in the present case comprises a washing part and a heat recovery step. In addition to lower installation costs also lower operation costs are gained owing to a lower pressure drop in the installation and because of reduced clogging of flue gas ducts and installation parts by dust and, consequently, because of less breakdowns.

Figure 3:
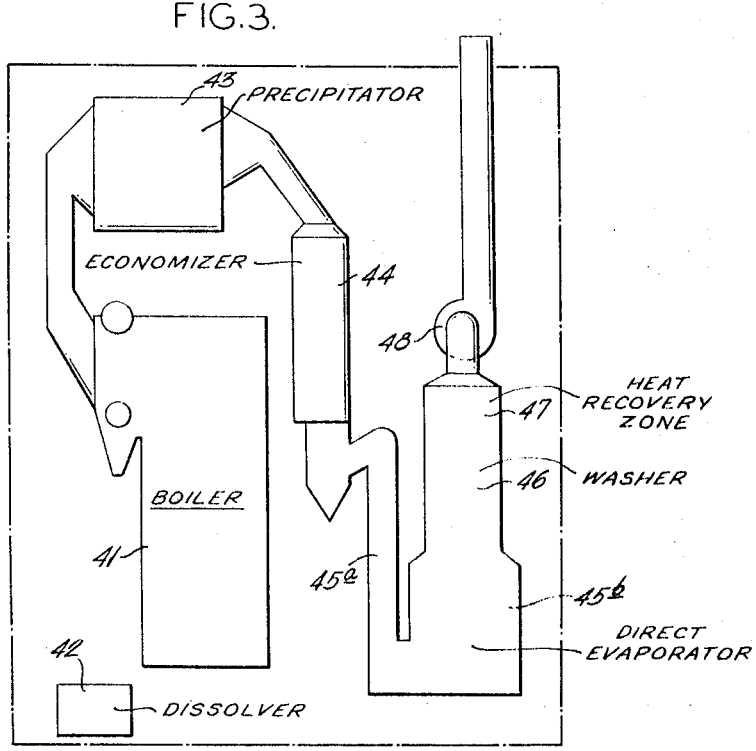

An embodiment of the invention is described more in detail in the following with reference to the accompanying drawing figures, wherein:

FIG. 1a shows a section of a direct evaporator according to the invention, assembled with a flue gas scrubber, FIG. 1b shows a corresponding installation modified to two circulation units in the direct evaporator step, FIG. 2 shows in a schematic way an installation according to the known U.S. system, and FIG. 3 shows an installation, in which a direct evaporator according to the invention is applied.

As appears from FIG. 1a, the apparatus comprises a direct evaporator 1, which is combined with a flue gas scrubber comprising a washing part 2 and a heat recovering part 3. The flue gases are introduced into the lower portion of the direct evaporator at 11, and the black liquor is injected on both sides into the flue gas connecting piece from nozzle ramps 12 and 13 and in the upper portion of the tower by special main nozzle ramps 14. The vertical inlet portion can be designed with varying height, and also embodiments with a horizontal gas inlet may be applied. The black liquor is collected in the lower portion and recirculated to the main nozzle ramp 14 in a closed circuit by a pump 15. Part of the black liquor flow is taken out through a pipe 16 to a recovery boiler (not shown) to be combusted therein, and a quantity of liquor of lower concentration, which corresponds to the liquor amount taken out and the evaporated water amount, is introduced immediately upstream of the nozzle ramps 14 through a pipe 17. As a result thereof, the concentration of the liquor supplied to the nozzle ramps 14 is lower than the concentration of the finally evaporated liquor so that the difficulties caused by clogging of the nozzles are considerably reduced. At the same time the heat transfer is substantially improved over that in conventional embodiments, due to the distinct counter-flow principle in the direct evaporator part, whereby the required total surface of the drops can be held smaller and greater drop sizes can be used. The risk of black liquor drops being carried out with the flue gas is hereby reduced considerably.

According to an alternative embodiment, see FIG. 1b the liquor is collected by an intermediate bottom 18 and is returned to the nozzle ramp 14'. Part of the liquor, which corresponds to the liquor amount supplied through the pipe 17', reduced by the evaporated quantity, is transferred by an overflow pipe 19 provided with a suitable control equipment to a lower circulation circuit provided with a pump 15' and a nozzle ramp 20.

The novel direct evaporator according to the invention can be combined with a subsequent washing step, in which an alkaline liquid is circulated. $H_2S$ and $SO_2$ separated by the direct evaporation as well as such gaseous components from combustions are absorbed to the greatest possible extent, and also dust particles following along are caught by the liquid drops. The liquid preferably can be maintained alkaline by the addition of weak wash liquid 21 from causticizing in the mixing department, and possibly water 22 is added. For preventing too great an increase in concentration of the circulating liquid, which is collected on and removed from an intermediate bottom 23, part of the circulation amount is drawn off to the mixing department through a pipe 24. Above said washing step is arranged a highly effective drop separator 25, which prevents alkaline liquid from being carried over to the subsequent heat recovering step.

In the heat recovering step hot water is prepared according to a conventional method in that cold water 31 is introduced into a nozzle ramp 32 at its upper portion and passes the flue gases in a counter-flow. In view of the generally high requirements with respect to the temperature of the hot water, which requirements are determined by other parts of the process, for example by the pulp washing subsequent to the digester house and in the bleaching department, the heat recovering part usually must comprise two or three steps. In such a case the drops in the flue gases are caught by a series of intermediate bottoms 33, of which the last bottom is shown in the FIGS. 1a and 1b, and are returned through circulation pumps to an underlying nozzle ramp, whereafter this process is repeated in the necessary number of steps, until the outgoing water 34 has reached the desired temperature.

The advantages of the novel recovery installation appear from FIGS. 2 and 3. FIG. 2 shows the older system according to the U.S. construction method. In this figure a recovering boiler 35 with a dissolver 36 is placed farthest to the front in the installation and is followed by an economizer 37, direct evaporator 38, precipitator 39 and hot water scrubber 40.

FIG. 3 shows in a schematic way the novel construction manner, which is rendered possible by applying the black liquor evaporation method according to the invention. Here the precipitator 43 has been placed above the recovering boiler 41 with the dissolver 42, and the flue gases pass from the precipitator to a steel-tube economizer 44, which cools the flue gas to the temperature 250° C., which is normal in U.S.A. Thereafter the flue gases are introduced by an inlet 45a into a direct evaporator 45b according to the invention, where the black liquor is evaporated from, say 55% to 65%. The flue gas is thereafter directed through an alkaline washing step 46 and a hot water preparation step 47 to a flue gas fan 48 mounted on the top of the installation. It appears from the figure how the installation can be given a much more concentrated design compared with conventional constructions and how small the intermediate flue gas ducts can be made.

I claim:
1. A method for the recovery of chemicals and heat from black liquor in a direct contact spray evaporator adapted to receive flue gases from a liquor combustion furnace and having an upper and a lower circulation system, each system including a downwardly directed nozzle bank, a corresponding liquid collecting bottom underlying each said bank to collect liquid from its nozzles, and means to recirculate a portion of the collected liquid from said bottom to said nozzle bank, comprising the steps of directing flue gases upwardly through said lower and upper circulation systems in sequence and countercurrent to the liquid flow therein, feeding black liquor into said upper circulation system to mix with said upper system recirculating liquid upstream of the nozzle bank of said upper system, drawing off a part of the liquor collected by the bottom of said upper system and feeding said drawn off liquor into the nozzle bank of said lower system to mix with the recirculated black liquor collected on the bottom of said lower system upstream of said lower nozzle bank, said black liquor which is fed into said upper circulation system upstream of said first nozzle bank being make-up liquor of low concentration, and drawing off liquor of the desired concentration from the lower system downstream of its collecting bottom.

2. A method according to claim 1 including the steps of washing the gases discharged from said evaporator by contacting the same with an alkaline liquid for cleaning the flue gases from hydrogen sulphide and sulphur dioxide, and recovering heat from the washed gases by contacting the same with cold water and collecting the water heated by said gases for use elsewhere.

3. Apparatus for the recovery of chemicals and heat from black liquor comprising a direct contact spray evaporator, means for connecting said evaporator to a liquor combustion furnace to direct flue gases therefrom upwardly through said evaporator, said evaporator including upper and lower liquid circulation systems, each system comprising a downwardly directed nozzle bank, a corresponding liquid collecting bottom underlying each said nozzle bank to collect liquid falling from its nozzle bank, and means to recirculate a portion of the collected liquid to its nozzle bank, means interconnecting said upper and lower systems to draw off a portion of the liquid collected in the bottom of said upper system and introduce said portion into and to mix with the liquid of said lower system upstream of its nozzle bank, means to draw off black liquor collected in the bottom of said lower system as product, and means to introduce liquor of low concentration into and to mix with the recirculation liquid in said upper system upstream of its nozzle bank, and washer and heat recovery zones connected to said evaporator to receive in sequence the exhaust flue gases flowing therefrom, said washer including spray nozzles and liquid collector means for cleaning the flue gases from hydrogen sulphide and sulphur dioxide by contact with an alkaline liquid, said heat recovery zone including spray nozzle means for introducing cold water into contact with the washed flue gas and to heat said water and means to collect said heated water for use elsewhere.

References Cited

UNITED STATES PATENTS

| 2,005,422 | 6/1935 | Hunicke et al. | |
| 2,064,953 | 12/1936 | Serpas | 110—7 |
| 2,303,811 | 12/1942 | Badenhausen | 23—262 |
| 2,771,281 | 11/1956 | Otto | 261—22 |

NORMAN YUDKOFF, Primary Examiner

J. SOFER, Assistant Examiner

U.S. Cl. X.R.

159—48; 261—17, 117